United States Patent
Degenhardt et al.

(10) Patent No.: US 7,996,462 B2
(45) Date of Patent: Aug. 9, 2011

(54) COLLABORATIVE AGENT FOR A WORK ENVIRONMENT

(75) Inventors: Wolfgang Degenhardt, Spiesen-Elversberg (DE); Klaus Wriessnegger, Heidelberg (DE)

(73) Assignee: SAP AG, Walldorf (DE)

( * ) Notice: Subject to any disclaimer, the term of this patent is extended or adjusted under 35 U.S.C. 154(b) by 1059 days.

(21) Appl. No.: 10/903,505

(22) Filed: Jul. 30, 2004

(65) Prior Publication Data

US 2006/0026231 A1    Feb. 2, 2006

(51) Int. Cl.
*G06F 15/16* (2006.01)
(52) U.S. Cl. ......... 709/204; 707/608; 707/738; 707/800
(58) Field of Classification Search .......... 709/204–205; 707/708, 709, 713, 726, 728, 771
See application file for complete search history.

(56) References Cited

U.S. PATENT DOCUMENTS

| | | | |
|---|---|---|---|
| 6,438,580 B1 * | 8/2002 | Mears et al. | 709/204 |
| 6,721,748 B1 * | 4/2004 | Knight et al. | 1/1 |
| 6,744,447 B2 * | 6/2004 | Estrada et al. | 715/751 |
| 7,139,798 B2 * | 11/2006 | Zircher et al. | 709/204 |
| 7,392,278 B2 * | 6/2008 | Chen et al. | 707/3 |
| 7,593,954 B1 * | 9/2009 | Lloyd et al. | 1/1 |
| 2001/0032244 A1 * | 10/2001 | Neustel | 709/206 |
| 2002/0052928 A1 * | 5/2002 | Stern et al. | 709/218 |
| 2003/0005053 A1 * | 1/2003 | Novaes | 709/204 |
| 2003/0115116 A1 * | 6/2003 | Crampton | 705/27 |
| 2003/0217105 A1 * | 11/2003 | Zircher et al. | 709/205 |
| 2004/0111467 A1 * | 6/2004 | Willis | 709/203 |
| 2004/0236673 A1 * | 11/2004 | Eder | 705/38 |

* cited by examiner

*Primary Examiner* — William C Vaughn, Jr.
*Assistant Examiner* — Mohamed Ibrahim
(74) *Attorney, Agent, or Firm* — Mintz, Levin, Cohn, Ferris, Glovsky and Popeo, P.C.

(57) ABSTRACT

A system and method for connecting information resources in a collaborative work environment. A system includes at least one information source providing collaboration data, and a repository framework including at least one source for storing the collaboration data. A collaborative bot service is connected with the repository framework, and includes one or more bots, or autonomous programs, configured to traverse the source via the repository framework, extract a topic from a portion of the collaboration data, and create a link between the portion of the collaboration data and an information resource related to the collaboration data based on the topic.

19 Claims, 3 Drawing Sheets

COLLABORATIVE AGENT FOR A WORK ENVIRONMENT

BACKGROUND

A collaborative work environment can include computer and communications hardware and software configured to execute and manage collaborative communications among organizationally- or work-related people. One example of a collaborative environment includes a web portal through which people communicate with others in an enterprise. The amount of information created and used in collaborative environments is continually growing. Managing this information has become an enormous challenge for environment administrators or owners of collaborative environments.

There presently exists a wide variety of collaborative tools that leverage collaborative work in a portal environment such as Discussions, Feedback, Comments, Chat, Frequently Asked Questions (FAQ), Urgent Requests (a collaborative application in which a questioner can ask for solutions to a problem, and in which a guaranteed response time can be provided), Web Logs, etc. These different information blocks are typically entered in a collaborative system without much integration support by the system itself. Any cross-relation between the blocks is detected only by chance, and information seldom leaves the compartment of the system in which it is created.

Another problem is that collaborative information is often unconnected to experts of the topic covered by the information. Information such as found in discussion groups is usually monitored by so-called "moderators," who may or may not be experts on a particular topic, but there presently is no mechanism to find out whether similar discussion threads are running in parallel. And, as long as existing experts are not invited by a moderator, their knowledge may be lost for the group.

SUMMARY

This document discloses collaborative bots configured for cross-linking people and information related with the same topic. A bot is an automatic and substantially autonomous program that gathers information from one or more information repositories to provide the information to a post-processing tool. The repositories are each a collection of information, such as documents, web pages, business objects, and discussion threads, etc. The repositories may exist within a repository framework, an integration platform for accessing the collections of information.

A collaborative bot is an agent that constantly monitors information provided by people while they collaborate. The information includes, without limitation, discussion threads, FAQ's, feedback loops, urgent requests, problem descriptions, chats, etc. The collaborative bot then identifies a topic of the information, and based on the topic, the bot is configured to execute one or more linking actions. For example, the collaborative bot can create a cross-link to a similar relevant topic, involve experts that can contribute to the topic, or propose answers for problems based on similar problems. These linking actions reduce the amount of doubled or unnecessary work, bring the relevant knowledgeable people together, and/or speed up the round-trip communication in "question-and-answer" systems.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

A collaborative bot system for enhancing collaboration data is described. Collaboration data includes information from a source stored in a repository. The bot system includes one or more bots that automatically and systematically traverse the collaborative data, extract the "idea" behind the collaborative information using a text mining tool, and create one or more links between different parts of the collaborative information, to other resources or to people who can contribute.

Figure 1:
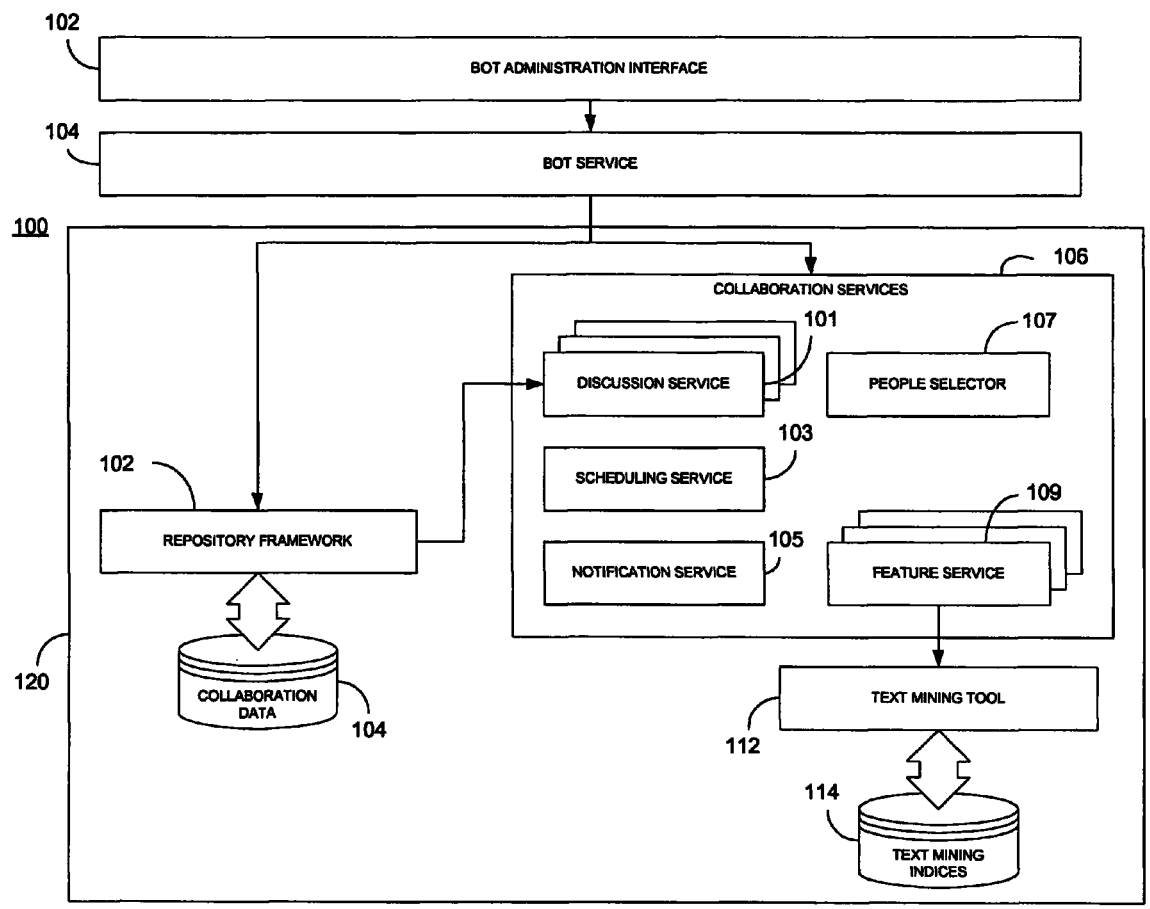
FIG. 1 is an architectural block diagram of a collaborative bot system.

FIG. 1 shows a collaborative bot system 100. The system includes a bot administration interface 102 through which a bot receives instructions and configuration information, and a collaborative bot service 104 having one or more bots. The bots can be implemented as independent services on top of knowledge management (KM) and collaboration platform 120. The bot administration interface 102 can include a graphical user interface (GUI) providing any number of tools and input windows for receiving the instructions and configuration information. The bot administration interface 102 can also include security and access controls.

Each bot in the collaborative bot service 104 is an agent program, configured by instructions from a user but automatically and substantially autonomously executing its instructions on a computer network. Each bot is configured to "crawl" collaboration data 110 and extract a topic, i.e. theme, subject matter, etc., of a portion of the collaboration data 110. The portion can include all or part of the collaboration data 110. The collaboration data 110 includes, but is not limited to, web pages, discussion threads, FAQ's, feedback loops, requests for information and/or help, problem descriptions, chats, e-mails, etc. Each bot constantly monitors collaboration data provided by people while they collaborate.

Each bot is further configured to extract a topic from the portion of collaboration data 110, and create a link between the portion of collaboration data 110 and an information resource related to the collaboration data 110 based on the topic. The information resource can include another source of collaboration data, an information source related to an expert of the topic, or other source information. The information resource can also be connected to an interface, in which the bot provides an answer to a problem or query. The bots execute a process to gain a logical "understanding" of the portion of collaboration data 110, and based on that knowledge, link the collaboration data 110 to other information, the topic of which is predetermined or determined in real-time.

There can be many different types of bots for various purposes. The bots can be programmed to automatically insert relevant information into a collaborative process. Examples include inserting a link pointing to a relevant document or web page into a discussion group, proposing an answer for an FAQ, establish cross-link between two similar discussions. The bots can also be programmed to invite an expert to participate in a collaborative process. Examples of this are inviting an expert into a discussion group or inviting an expert to participate in a chat session The collaborative bot system 100 further includes collaboration services 106 for providing the link for any of a number of information sources, for generating a cross-link among information sources based on the link generated by the collaborative bot service 104, and for general management of the collaborative bot service 104. The collaboration services 106 include discussion services 101, each configured to provide links to individual topical discussion threads or feedback messaging systems or portions thereof. A scheduling service 103 is configured to run the bots in a batch mode. A people selector 107 is configured to search, find and link to experts relevant for a topic extracted by a bot. Accordingly, the people selector 107 also employs bot services 104 for traversing information associated with such experts to extract a topic about which the experts have knowledge.

The collaboration services 106 also include a notification service 105 configured to inform users about duplicate or obsolete information regarding the output of the collaborative bot service 104. One or more feature services 109 provide links to other text-based information sources, such as web pages, e-mail storage, message databases, etc.

The task of extracting the topic or determining the underlying idea of the resources is facilitated by a repository framework 108 that allows uniform access to all types of collaboration data resources—no matter whether they are discussion threads, feedback texts or even online chat entries. An example of the repository framework 108 is described in U.S. patent application Ser. No. 10/330,689, filed Dec. 27, 2002 entitled "Managing Multiple Data Stores" and assigned to SAP AG of Walldorf, Germany, the contents of which are hereby incorporated by reference for all purposes.

The KM and Collaboration platform 120 includes a text mining tool 112 for traversing text of any desired source of collaboration data 110. A bot can be programmed to use the text mining tool 112 for a specific source of collaboration data 110. The text mining tool 112 generates and uses text mining indices 114 for determining a content and/or topic of any portion of text-based collaboration data 110. The text mining tool 112 is also configured to retrieve and classify text according to desired user preferences.

Figure 2:
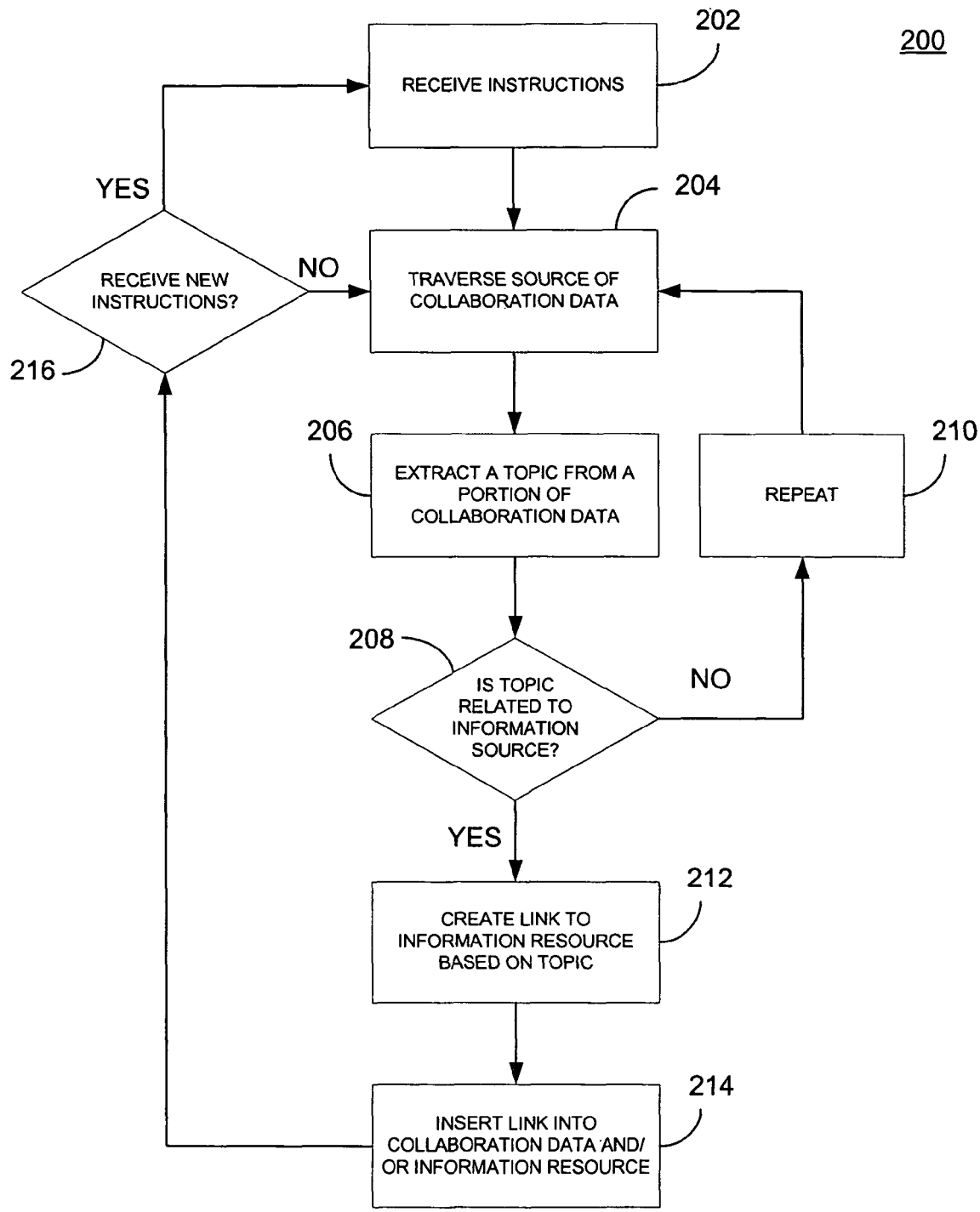
FIG. 2 is a flowchart of a method of connecting information resources in a collaborative work environment.

FIG. 2 is a flowchart of a method 200 of connecting information resources in a collaborative work environment. At 202, a bot receives instructions for its purpose, i.e. the type of information and/or content for which it will search and process. At 204, the bot traverses text-based information from a source of collaboration data. The bot employs a text mining tool to determine the context of the source of collaboration data, and at 206 extracts a topic from at least a portion of the collaboration data. The topic can be a theme, idea, or concept such as a subject matter, question, problem, etc.

At 208, the bot determines whether the topic is related to another information source, either from the same or different source of collaboration data. In an exemplary embodiment, the bot maintains a list of topics from all of the information sources it monitors. If there is no relation, at 210 the bot repeats its task of traversing or "crawling" the same or different source of collaboration data to determine the topic(s) thereof. If a relation is found, the bot will create a link to the other information source at 212.

At 214, the bot can insert the link to the source of collaboration data, generate a cross-link between the source of collaboration data and the other information source, or otherwise form a connection between the source of collaboration data and the other information source. At 216, the bot may receive new instructions, i.e. to look for a different type of information or to crawl a different source of collaboration data. If new instructions are to be received, the method begins again at 202. If not, the bot maintains its task of monitoring the same source of collaboration data for the same type of information.

Figure 3:
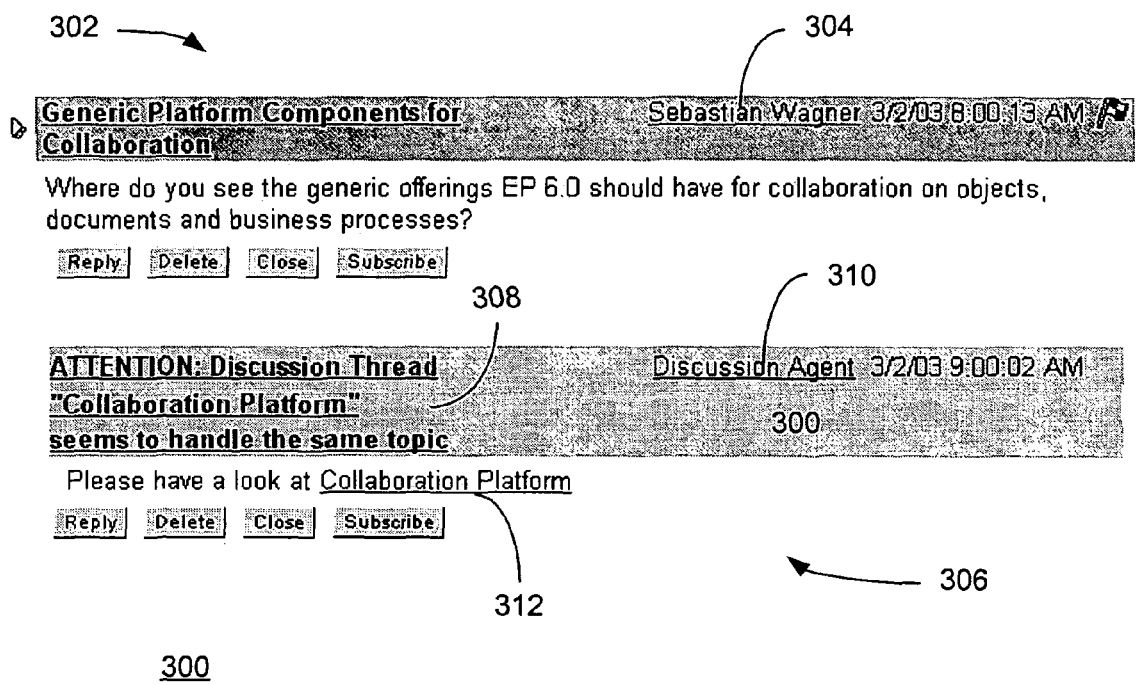
FIG. 3 shows an exemplary embodiment of a user interface illustrating an output of a collaborative bot.

FIG. 3 shows an exemplary embodiment of a user interface 300 illustrating a use case and product of a collaborative bot. The user interface 300 shows a discussion group query 302 by a user 304. The query 302 includes a question (collaborative data) seeking information for a specific topic (i.e. where to find specific information about a product). A bot will traverse the question to determine a topic (EP 6.0, collaboration on objects, documents, and business processes).

The bot then will generate a link 312 to an information source based on the topic. In the case illustrated, the link 312 is provided in the discussion group thread as a response 308 to the discussion group query 302. The response also provides a bot identifier 310 to show that the answer has been generated by the bot service. The response 308 is automatically inserted by the collaborative bot into the user interface 300 in a close proximal relation to the query 302 to enable a quick and efficient source of information for the user.

Although a few embodiments have been described in detail above, other modifications are possible. The logic flow depicted in FIG. 2 may be performed in an order other than that shown and still be within the scope of the embodiments described herein. Other embodiments may be within the scope of the following claims.

The invention claimed is:

1. A method comprising:

maintaining, by an agent comprising an autonomous bot implemented by one or more processors, a topic list of topics previously identified in a plurality of collaboration data sources that are monitored by the agent, the plurality of collaboration data sources comprising a collaborative work environment that comprises a portal facilitating communication between a plurality of users who contribute collaboration information to the collaborative work environment via one or more user interfaces;

monitoring, automatically and autonomously by the agent, the collaborative work environment, the monitoring comprising the collaboration information provided within the collaborative work environment;

extracting, by the agent using a text-mining tool upon detection via the monitoring of new collaboration information contributed by one of the plurality of users in the collaborative work environment for use by at least one other of the plurality of users in the collaborative work environment, an extracted topic of the new collaboration information, the extracted topic comprising at least one of a theme, a question, a problem, and a subject matter of the new collaboration information;

identifying an information resource within the plurality of collaboration data sources that is related to the extracted topic, the identifying comprising comparing the extracted topic to the topic list and determining that previously contributed collaboration information available from the information resource has a topic related to the extracted topic;

creating, by the agent, a link insertable into a collaborative process, through which the plurality of users can send communications, of the collaborative work environment, the link being to the information resource identified as related to the extracted topic of the new collaboration information contributed by the one of the plurality of users for use by the at least one other of the plurality of users in the collaborative work environment; and inserting, automatically by the agent, the link into the collaborative process through which the plurality of users can send communications and into the user interface in a close proximal relation to the new collaboration information.

2. A method in accordance with claim 1, further comprising accessing the plurality of collaboration data sources via a repository framework.

3. A method in accordance with claim 1, wherein the information resource is associated with an expert related with the extracted topic.

4. A method in accordance with claim 3, further comprising:

traversing collaboration data provided by the expert in the information resource;

extracting a second topic from a portion of the collaboration data provided by the expert; and adding the second topic to the topic list.

5. A method in accordance with claim 4, further comprising comparing the extracted topic from the new collaboration information with the second topic extracted from the portion of collaboration data provided by the expert.

6. A method in accordance with claim 4, further comprising storing, in a table, the second topic from the portion of the collaboration data provided the expert.

7. A method in accordance with claim 1, wherein the traversing of the collaborative work environment occurs according to a schedule.

8. A system for connecting information resources, the system comprising:

at least one of a processor and a memory providing:

a collaborative work environment accessible by a plurality of users who contribute collaboration data to the collaborative work environment via one or more user interfaces;

a repository framework including a plurality of collaboration data sources that includes the collaborative work environment; and a collaborative bot service connected with the repository framework, the collaborative bot service including one or more bots that perform functions comprising:

maintaining a topic list of topics previously identified in the plurality of collaboration data sources automatically and autonomously monitoring the collaboration work environment, the monitoring comprising traversing the collaboration information provided within the collaborative work environment via a user interface by the plurality of users;

extracting, using a text-mining tool upon detection via the monitoring of new collaboration information contributed by one of the plurality of users in the collaborative work environment for use by at least one other of the plurality of users in the collaborative work environment, an extracted topic of the new collaboration information, the extracted topic comprising at least one of a theme, a question, a problem, and a subject matter of the new collaboration information;

identifying an information resource within the plurality of collaboration data sources that is related to the extracted topic, the identifying comprising comparing the extracted topic to the topic list and determining that previously contributed collaboration information available from the information resource has a topic related to the extracted topic;

creating a link insertable into a collaborative process, through which the plurality of users can send communications, of the collaborative work environment, the link being to the information resource identified as related to the extracted topic of the new collaboration information contributed by the one of the plurality of users for use by the at least one other of the plurality of users in the collaborative work environment; and inserting the link into the collaborative process through which the plurality of users can send communications and into the user interface in a close proximal relation to the new collaboration information.

9. A system in accordance with claim 8, wherein each of the one or more bots is preprogrammed to run in a batch mode according to a schedule.

10. A system in accordance with claim 8, wherein each of the one or more bots runs in real time upon detection of any of the plurality of users adding new collaboration information.

11. A system in accordance with claim 8, further comprising a discussion service within the collaborative work environment, the discussion service providing a discussion thread in the user interface, one or more of the plurality of users providing the collaboration information in the discussion thread.

12. A system in accordance with claim 8, further comprising a people selector service that identifies the information resource based on the information resource being associated with an expert related to the topic.

13. A system in accordance with claim 8, further comprising an administration interface for receiving user commands and for configuring each of the one or more bots.

14. A system for connecting information resources in a collaborative work environment, the system comprising:

at least one of a processor and a memory providing:

a collaborative bot service comprising one or more bots that perform functions comprising:

maintaining a topic list of topics found in a plurality of collaboration data sources, the plurality of collaboration data sources comprising a collaborative work environment that comprises a portal facilitating communication between a plurality of users who contribute collaboration information to the collaborative work environment via one or more user interfaces;

automatically and autonomously monitoring the collaboration work environment, the monitoring comprising traversing the collaboration information provided within the collaborative work environment via a user interface by the plurality of users;

extracting, using a text-mining tool upon detection via the monitoring of new collaboration information contributed by one of the plurality of users in the collaborative work environment for use by at least one other of the plurality of users in the collaborative work environment, an extracted topic of the new collaboration information, the extracted topic comprising at least one of a theme, a question, a problem, and a subject matter of the new collaboration information;

identifying an information resource within the plurality of collaboration data sources that is related to the extracted topic, the identifying comprising comparing the extracted topic to the topic list and determining that previously contributed collaboration information available from the information resource has a topic related to the extracted topic;

creating a link insertable into a collaborative process, through which the plurality of users can send communications, of the collaborative work environment, the link being to the information resource identified as related to the extracted topic of the new collaboration information contributed by the one of the plurality of users for use by the at least one other of the plurality of users in the collaborative work environment; and inserting the link into the collaborative process through which the plurality of users can send communications and into the user interface in a close proximal relation to the new collaboration information.

15. A system in accordance with claim 14, further comprising a repository framework providing access to the plurality of collaboration data sources including the collaborative work environment.

16. A method in accordance with claim 1, wherein the collaborative work environment comprises a discussion group and the new collaboration information comprises a discussion group entry by the one of the plurality of users, the query comprising a natural language question or statement regarding a requested topic.

17. A method in accordance with claim 16, wherein the link is provided as part of an answer or response to the question or statement that is displayed in the user interface as a reply to the discussion group entry.

18. A method in accordance with claim 17, wherein the answer or response further comprises a bot identifier to show that the answer or response was generated by the agent.

19. A method in accordance with claim 1, further comprising:

adding the extracted topic to the topic list.

* * * * *